United States Patent
Hall et al.

(10) Patent No.: US 10,864,753 B2
(45) Date of Patent: Dec. 15, 2020

(54) ELECTRON BEAM CURABLE INKJET FORMULATIONS WITH IMPROVED CHEMICAL RESISTANCE

(71) Applicant: SUN CHEMICAL CORPORATION, Parsippany, NJ (US)

(72) Inventors: Stephen Anthony Hall, Wells (GB); Derek Ronald Illsley, Bath (GB)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 16/091,869

(22) PCT Filed: Apr. 10, 2017

(86) PCT No.: PCT/US2017/026755
§ 371 (c)(1),
(2) Date: Oct. 5, 2018

(87) PCT Pub. No.: WO2017/180494
PCT Pub. Date: Oct. 19, 2017

(65) Prior Publication Data
US 2019/0366734 A1   Dec. 5, 2019

Related U.S. Application Data

(60) Provisional application No. 62/320,657, filed on Apr. 11, 2016, provisional application No. 62/320,640, filed on Apr. 11, 2016, provisional application No. 62/449,168, filed on Jan. 23, 2017.

(51) Int. Cl.
| | |
|---|---|
| *B05D 3/02* | (2006.01) |
| *B05D 3/06* | (2006.01) |
| *C09D 11/101* | (2014.01) |
| *C09D 11/30* | (2014.01) |
| *B41M 5/00* | (2006.01) |
| *C09D 11/32* | (2014.01) |
| *C09D 11/36* | (2014.01) |
| *C09D 11/38* | (2014.01) |
| *B41J 11/00* | (2006.01) |

(52) U.S. Cl.
CPC .......... *B41J 11/002* (2013.01); *B05D 3/0209* (2013.01); *B05D 3/067* (2013.01); *B05D 3/068* (2013.01); *B41M 5/0023* (2013.01); *C09D 11/101* (2013.01); *C09D 11/30* (2013.01); *C09D 11/32* (2013.01); *C09D 11/36* (2013.01); *C09D 11/38* (2013.01); *B05D 2502/00* (2013.01); *B05D 2506/25* (2013.01); *B05D 2508/00* (2013.01); *B05D 2518/00* (2013.01)

(58) Field of Classification Search
CPC ........ B41J 2/1433; B41J 2/161; B41J 2/1623; B41J 2202/00; B41J 2202/03; B41J 2/14201; B41J 2/045; B41J 3/4078; B41J 11/002; B41J 29/377; B41J 2/01; B41J 2/211; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B65H 23/26; B65H 2404/14211; B41M 5/0047; B41M 5/0011; B41M 5/0017; B41M 7/00; B41M 7/0072; B41M 5/52; B41M 5/5218; D06P 5/001; D06B 19/0076; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52

See application file for complete search history.

(56) References Cited

U.S. PATENT DOCUMENTS

| | | | |
|---|---|---|---|
| 5,260,349 A | 11/1993 | Crivello et al. | |
| 5,407,708 A | 4/1995 | Lovin et al. | |
| 5,527,578 A | 6/1996 | Mazurek et al. | |
| 5,587,405 A | 12/1996 | Tanaka | |
| 6,429,235 B1 * | 8/2002 | Varlemann | C07C 69/54 522/14 |
| 6,569,500 B1 | 5/2003 | Sigel et al. | |

(Continued)

FOREIGN PATENT DOCUMENTS

| | | |
|---|---|---|
| BE | IN3549CHN2009 A | 9/2015 |
| EP | 0 588 533 A2 | 3/1994 |

(Continued)

OTHER PUBLICATIONS

International Search Report issued in International Application No. PCT/US2017/026755 dated Jun. 27, 2017.
Written Opinion of the International Searching Authority issued in International Application No. PCT/US2017/026755 dated Jun. 27, 2017.
U.S. Appl. No. 16/092,045, filed Oct. 8, 2018.
U.S. Appl. No. 16/091,386, filed Oct. 4, 2018.
International Search Report issued in International Application No. PCT/US2017/026757 dated Jul. 6, 2017.
Written Opinion of the International Searching Authority issued in International Application No. PCT/US2017/026757 dated Jul. 6, 2017.

(Continued)

*Primary Examiner* — Manish S Shah
(74) *Attorney, Agent, or Firm* — Marian E. Fundytus; Ostrolenk Faber LLP.

(57) ABSTRACT

The present invention is directed to a method for printing energy curable ink and coating compositions comprising high amounts of monofunctional monomers that exhibit both good adhesion to plastic substrates, and good solvent resistance. The method of the present invention employs electron beam curing of the ink and coating compositions, at accelerating voltages greater than or equal to 70 keV, and electron beam doses greater than or equal to 30 kGy, and preferably greater than or equal to 40 kGy.

19 Claims, No Drawings

(56) References Cited

U.S. PATENT DOCUMENTS

| | | | |
|---|---|---|---|
| 6,730,363 B1 | 5/2004 | Shah et al. | |
| 7,270,408 B2 | 9/2007 | Odell et al. | |
| 8,476,334 B2 | 7/2013 | Illsley et al. | |
| 2007/0225585 A1 | 9/2007 | Washbon et al. | |
| 2008/0018695 A1 | 1/2008 | Kadomatsu et al. | |
| 2008/0090018 A1* | 4/2008 | Inaba | C09D 4/00 427/496 |
| 2009/0027198 A1 | 1/2009 | DiPoala et al. | |
| 2009/0074982 A1* | 3/2009 | Nakamura | C09D 11/101 427/511 |
| 2011/0046257 A1* | 2/2011 | Webster | C08G 63/6958 522/148 |
| 2014/0378561 A1 | 12/2014 | Van Berchum et al. | |
| 2015/0225585 A1 | 8/2015 | De Rossi et al. | |

FOREIGN PATENT DOCUMENTS

| | | |
|---|---|---|
| EP | 1 829 902 A1 | 9/2007 |
| EP | 2 233 540 A1 | 9/2010 |
| JP | 2003276178 A | 9/2003 |
| JP | 2003320744 A | 11/2003 |
| JP | 2003320746 A | 11/2003 |
| JP | 2004/058566 A | 2/2004 |
| JP | 2004098309 A | 4/2004 |
| JP | 2004338100 A | 12/2004 |
| JP | 2005126509 A | 5/2005 |
| JP | 2006001226 A | 1/2006 |
| JP | 2010023488 A | 2/2010 |
| JP | 2016/180072 | 10/2016 |
| WO | WO 94/22596 A1 | 10/1994 |
| WO | WO 2014/063997 A1 | 5/2014 |
| WO | WO 2014/126720 A1 | 8/2014 |
| WO | WO 2015/049873 A1 | 4/2015 |
| WO | WO 2015/148094 A1 | 10/2016 |
| WO | WO 2016/164220 A1 | 10/2016 |
| WO | WO 2016/186838 A1 | 11/2016 |

OTHER PUBLICATIONS

International Search Report issued in International Application No. PCT/US2017/026749 dated Jun. 27, 2017.
Written Opinion of the International Searching Authority issued in International Application No. PCT/US2017/026749 dated Jun. 27, 2017.
International Preliminary Examination Report issued in PCT/US2017/026757, dated Oct. 16, 2018.
International Preliminary Examination Report issued in PCT/US2017/026749, dated Oct. 16, 2018.
International Preliminary Report issued in PCT/US2017/026755, dated Oct. 16, 2018.
European Search Report issued in counterpart EP application No. 17 78 2901 dated Oct. 30, 2019.

\* cited by examiner

ELECTRON BEAM CURABLE INKJET FORMULATIONS WITH IMPROVED CHEMICAL RESISTANCE

CROSS REFERENCE TO RELATED APPLICATIONS

The present application is a § 371 National Stage application based on PCT/US2017/026755 filed Apr. 10, 2017, which claims the benefit of U.S. Provisional Application No. 62/320,640 filed Apr. 11, 2016, U.S. Provisional Application No. 62/320,657 filed Apr. 11, 2016, and U.S. Provisional Application No. 62/449,168 filed Jan. 23, 2017, the subject matter of each of which is hereby incorporated by reference in its entirety.

FIELD OF THE INVENTION

The present invention is related to a method for printing energy curable ink and coating compositions that comprise high amounts of monofunctional monomers, achieving cured inks that exhibit both good adhesion to plastic substrates, and good solvent resistance. The method of the present invention employs electron beam curing of the ink and coating compositions, using high doses of electron beam radiation.

BACKGROUND

Ultraviolet light (UV) reactive inkjet printing has become well known as a reliable printing method for graphic display and single pass applications, such as printing onto labels. More recently, by careful selection of raw materials, energy curable low migration inks and coatings have been produced. Within the market area of food packaging, single pass energy curing inkjet can be used where short runs are required, or there are advantages in eliminating time taken for image changeover; or to avoid the need to hold printed stock ("point of fill" printing). Thus, the overall print cost can be lower than conventional flexography or gravure printing. After printing, there is a cure stage, where photoinitiators (PI's) interact with UV light to form free-radicals which then react with double bonds in the acrylate monomers to initiate free radical polymerization, creating a colored image polymeric coating.

In an electron beam curing unit, electrons are produced from a filament, then accelerated through a vacuum, and passed through a foil window to exit the generation area. The beam then travels across a gap before passing into an ink layer on the carrying substrate. Here, the electrons may generate a free radical. Lead shielding is present to trap X-rays which may also be generated. The presence of oxygen above and in the film can consume the radicals created, therefore a layer of inert gas, usually nitrogen, is typically present in the curing area of the machine. This replaces the oxygen, and prevents the radicals being quenched.

The energy of a typical UV photon, particularly in the UVA and UVB regions of the UV spectrum, is below the chemical bond energy of acrylate monomers, meaning that the curing reaction cannot be initiated without the presence of a photoinitiator (PI). As the energy of electron beam (EB) electrons exceeds the bond energy of acrylate monomers, they can initiate cure without added PI. Problems of migration, taint, and odour associated with uncured photoinitiator and photoinitiator fragments are then eliminated. With EB curing, the relationship between the crosslink density and the resultant adhesion and chemical resistance will be altered compared to cure by ultraviolet light, which can give significant advantages.

IN3549CHN2009 discloses a method of producing printed 3-D objects by printing a mixture of two or more fluids by inkjet onto a support, at least partially curing the jetted mixture by actinic radiation or electron beam, and repeating the procedure to produce multiple layers of inks. The process builds a 3-D relief on the support.

US 2015/0225585 discloses solvent based inkjet inks that comprise at least two solvents, each having differing evaporation rates. The inkjet inks are free from photoinitiators and are electron beam curable.

JP 2010-023488 describes glass plates printed with UV inkjet inks which are then overprinted with an electron beam cured clear overcoating. The layers are composed of different ink formulations, and are cured separately.

US 2009/0207198 provides an offset printing method that used an inkjet system to print a UV ink onto a flat original plate, irradiating the printed image with UV or electron beam radiation to bring the ink into a semi-dried state, and then transferring the semi-dried ink image to a surface of an elastic blanket, and offset printing the ink image transferred to the elastic blanket onto a product. The offset printed ink image is then dried and fixed on the product.

US 2008/0018695 provides a recording apparatus that forms an image on a recording medium by printing two liquids, one of which is printed on top of the other, and then irradiating the liquids by irradiating with electron beam radiation. The electron beam device radiates the electron beam at an accelerating voltage of 40 kV to 60 kV.

JP 2006-001226 describes a method of manufacturing an inkjet recording material wherein a substrate is coated with an aqueous solution containing a polymer with an acetoacetyl group, and at least inorganic particulates. The aqueous solution is irradiated with an electron beam before drying.

JP 2005-126509 discloses an ink for inkjet printing that contains at least an oil-gelling agent and an electron beam curable composition.

JP 2004-338100 describes a coating layer that is composed of a water based paint that contains no radically polymerizable unsaturated bonds that forms a hydrogel when irradiated by electron beam. The coating layer is subsequently overprinted with a glossy layer.

JP 2004-098309 discloses an electron beam curable inkjet ink for printing onto metal coated plates that is cured efficiently under low accelerating voltage. The accelerating voltage is set to be no more than 150 kV.

JP 2003-320746 describes an inkjet receiving layer with improved adhesion on the support, wherein one of the coating layers comprises an aqueous paint that includes an electron beam curing component. Irradiation of the aqueous paint with the electron beam forms a hydrogel.

JP 2003-320744 discloses an inkjet recording body that is formed by coating a base material with an aqueous paint that includes an electron beam curing component. The coating layer forms a hydrogel when irradiated with electron beam radiation.

JP 2003-276178 discloses a radiation curable inkjet ink that can be cured, or the viscosity increased, by irradiating with visible light, UV, EB or IR radiation. No advantages of one type of radiation as opposed to the others are described.

It is generally believed, particularly in the case of plastic substrates, that while increasing the amount of monofunctional monomers in ink or coating compositions may improve adhesion to the substrate, there is a concomitant loss of resistance (e.g. scratch, chemical, solvent) as the amount of monofunctional monomers is increased. It is generally believed that while increasing the amount of multifunctional monomers in ink or coating compositions may improve resistance, there is a concomitant loss of adhesion. Consequently, attempts at producing an ink or coating composition that adheres well to the substrate, particularly a plastic substrate, while still maintaining resistance have generally been unsuccessful.

In addition, it is generally believed that high doses of EB radiation are likely to damage substrates, such as plastic substrates. Thus, in applications where EB radiation is used, the EB dose is typically kept low, usually below 30 kGy. It would therefore not be expected that, due to the presumed detrimental effects on the substrate, using high doses of EB radiation to achieve good adhesion and good resistance would be successful.

Thus, there remains a need in the art for energy curable ink and coating compositions that both adhere well to the substrate, and also have good resistance when cured.

SUMMARY OF THE INVENTION

The present invention provides a method of printing an energy curable ink or coating composition having both good adhesion and good resistance, for example, solvent resistance. The method can be used with ink and coating compositions that, under conventional printing parameters, have good adhesion to the substrate, but poor resistance.

In a particular aspect, the present invention provides a method for printing an energy curable ink or coating composition comprising:
a) providing an energy curable ink or coating composition, wherein the ink or coating composition comprises:
   i) greater than or equal to 20% (w/w) one or more monofunctional ethylenically unsaturated monomers or oligomers, based on the total weight of the ink or coating composition;
   ii) less than or equal to 50% (w/w) one or more multifunctional ethylenically unsaturated monomers or oligomers, based on the total weight of the ink or coating composition;
   iii) optionally, one or more solvents; and
   iv) optionally, one or more colorants;
b) applying the ink or coating composition of step a) to a substrate; and
c) curing the applied ink or coating composition by exposure to electron beam radiation, wherein:
   i) the accelerating voltage of the electron beam emitter is equal to or greater than 70 keV;
   ii) the cure dose is equal to or greater than 30 kGy.

In another aspect, the present invention provides a printed substrate prepared by the method of the present invention.

In another aspect, the present invention provides an article comprising a printed substrate prepared by the method of the present invention.

Other features of the present invention are described in more detail below.

DETAILED DESCRIPTION OF THE INVENTION

It is to be understood that the foregoing general description and the following detailed description are exemplary and explanatory only, and are not restrictive of any subject matter claimed.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

A problem that has not been adequately addressed by the prior art is how to achieve good print and resistance quality of energy curable inks and coatings, while still using high levels of monofunctional monomers to achieve good adhesion to the substrate, particularly for inkjet printing onto plastic substrates. The method of the present invention enables inkjet compositions to possess both excellent adhesive properties as a result of the correct choice of, and inclusion of high amounts of, monofunctional monomers, while delivering cured prints having exceptional solvent and abrasion resistance, the latter property which would conventionally only be achievable via the inclusion of substantial quantities of multifunctional monomers.

In a particular aspect, the present invention provides a method for printing an energy curable ink or coating composition comprising:
a) providing an energy curable ink or coating composition, wherein the ink or coating composition comprises:
   i) greater than or equal to 20% (w/w) one or more monofunctional ethylenically unsaturated monomers or oligomers, based on the total weight of the ink or coating composition;
   ii) less than or equal to 50% (w/w) one or more multifunctional ethylenically unsaturated monomers or oligomers, based on the total weight of the ink or coating composition;
   iii) optionally, one or more solvents; and
   iv) optionally, one or more colorants;
b) applying the ink or coating composition of step a) to a substrate; and
c) curing the applied ink or coating composition by exposure to electron beam radiation, wherein:
   i) the accelerating voltage of the electron beam emitter is equal to or greater than 70 keV;
   ii) the cure dose is equal to or greater than 30 kGy.

The present invention is the first time that the use of high doses of electron beam radiation, greater than 30 kGy, preferably greater than 40 kGy, and more preferably greater than 50 kGy, has been identified as a means of producing significantly improved solvent resistance of cured ink and coating films. This is especially the case for inkjet compositions comprising greater than 20% (w/w) of monofunctional monomers. The inventors have surprisingly found that such monofunctional monomer-rich inkjet compositions when cured under the action of electron beam radiation with doses of 30 kGy and greater, and especially 50 kGy and greater, produce cured prints that have significantly superior solvent resistance compared to similar inks cured under the action of UV radiation via the use of suitable photoinitiators. At the same time, the superior adhesion properties of these monofunctional monomer-rich inkjet compositions maintain their adhesion to a broad range of plastic substrates. Thus, the current invention enables inkjet compositions to possess both excellent adhesive properties as a result of the correct choice of monofunctional monomers, whilst delivering cured prints having exceptional solvent and abrasion resistance, the latter property which would conventionally only be achievable via the inclusion of substantial quantities of multifunctional monomers. The surprising finding that such higher EB doses induce significantly improved solvent resistance for monofunctional monomer rich inkjet compositions is advantageous in applications requiring improved resistance, such as printed labels for detergent packaging, for example. Indeed, the use of electron beam curing lends itself to the single pass printing of inkjet compositions where label printing is a significant application. It is a further aspect of the current invention that the inkjet compositions comprise less than 50% (w/w) multifunctional monomers, and more preferably less than 20% (w/w) of any blend of multifunctional monomers.

It is worth repeating the fact that the solvent resistance achieved via the EB-curing of monofunctional-rich inkjet compositions with doses of greater than 30 kGy, and preferably greater than 40 kGy, is a most surprising finding. Compared to similar inkjet compositions containing photoinitiators and cured under the action of UV, as well as those compositions cured with EB doses of 30 kGy and less, the solvent resistance is considerably greater. The inventors are not bound by any theory to this finding, but postulate that this is due to higher EB doses creating an increased number of active radical centres on both the monomers and growing polymer chains during the curing process. These radical centres act as points of polymerization initiation and induce crosslinking in the cured network. It is well recognized by those skilled in the art that crosslinked cured ink films possess greater solvent resistance than do non-crosslinked or lightly crosslinked structures. In the case of UV-curing, in the presence of photoinitators, and EB-curing at doses of less than 30 kGy, inkjet fluids comprising essentially only monofunctional monomers will produce predominantly linear copolymer structures. Such polymers are less solvent resistant than crosslinked structures.

Most commonly for the EB-curing of flexographic and offset inks, doses of less than 30 kGy are used. However, for the single pass inkjet printing of plastic substrates where press speeds are commonly less than 60 m/min, it is possible to cure the inks with the high doses specified by the current invention. Furthermore, with the ongoing development of improved EB-curing equipment it is now possible to deliver doses of 30 kGy, or greater, at press speeds in excess of 100 m/min. This capability could therefore enable higher productivity printing via EB-curing than might otherwise be achievable with current state of the art UV-curing. Clearly, this is an advantageous aspect of the invention. Thus, as will be clear to those skilled in the art, the current invention is particularly favourable for the printing of inkjet fluids.

DEFINITIONS

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, the terms "(meth)acrylate" or "(meth)acrylic acid" include both acrylate and methacrylate compounds, and both acrylic acid and methacrylic acid.

As used herein, "monofunctional" means having one functional group.

As used herein, "multifunctional" means having two or more functional groups. A multifunctional monomer, for e.g., can be a di-functional, tri-functional, tetra-functional or have a higher number of functional groups. The two or more functional groups can be the same or different.

As used herein, the terms "monomer" or "monomers" is intended to include both monomers and oligomers, or mixtures thereof.

As used herein, the terms "inks and coatings," "inks," "compositions" and "fluids" are used interchangeably.

As used herein, "energy-curing" refers to the cure achieved under exposure to various electromagnetic radiation sources producing an actinic effect. Such sources include but are not limited to, electron-beam, UV-light, visible-light, IR, or microwave. Where the compositions are cured under the action of UV light, then non-limiting UV sources such as the following can be used: low pressure mercury bulbs, medium pressure mercury bulbs, a xenon bulb, excimer lamps, a carbon arc lamp, a metal halide bulb, a UV-LED lamp or sunlight. It should be appreciated by those skilled in the art that any UV light source may be used to cure compositions prepared according to the current invention. Compositions of the current invention are especially suited for use in compositions curable under the action of UV light and/or electron-beam.

As used herein, the term "article" or "articles" means a substrate or product of manufacture. Examples of articles include, but are not limited to: substrates such as paper, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

Throughout this disclosure, all parts and percentages are by weight (wt % or mass % based on the total weight) and all temperatures are in ° C. unless otherwise indicated.

Electron Beam Curable Formulations and Methods of Printing

Inks formulated using monofunctional monomers typically produce softer coatings, with reduced solvent resistance, but with good adhesion profiles when compared to those formulated using multifunctional monomers. We have found that we can obtain good solvent resistance of a coating formulated with ethylenically unsaturated monomers if it is cured using electron beam ionization irradiation with an accelerating voltage greater than or equal to 100 keV and a dose greater than or equal to 40 kGy.

Monomers play a major role in determining the physical properties of a radiation curable inkjet formulation and the resulting film. Regardless of their chemical structure, they always require at least one polymerizable group. In the case of curing by a free-radical polymerization mechanism, which can be initiated by electron beam ionization radiation or via radical-generating photoinitiators, the polymerizable groups are in general carbon-carbon double bonds. The most important radically curable monomers used in inkjet inks contain acrylate or, less frequently, methacrylate groups. The monomers are usually derived from monoalcohols, diols, or polyols that are sometimes alkoxylated, which are usually esterified with either acrylic or methacrylic acid. The functionality, i.e., the number of polymerizable groups per molecule, is of major importance to the final performance of the inkjet ink. Formulations containing monomers with one polymerizable group will produce a linear polymer structure while those with two or more polymerizable groups will give rise to crosslinked polymer structures. As the crosslink density increases so will the hardness, and chemical and scratch resistance, but a resultant loss of adhesion often occurs. The crosslink density depends upon the average number of polymerizable groups per molecule of the monomer (i.e. the functionality) and the molecular weight between two crosslinks. The functionality normally lies between one and six for acrylate monomers with either one or two polymerizable groups being preferred for the formulation of free radically cured inkjet inks. In the context of the current invention, the polymerisable groups of the monomers include, as well as acrylate and methacrylate, any other ethylenically unsaturated group, including but not limited to vinyl ether, propenyl ether, acrylamide, methacrylamide, maleate, fumarate, etc. It should be appreciated by those skilled in the art that any free radically polymerisable group containing monomer can form part of compositions according to the current invention.

The ink and coating compositions of the present invention preferably comprise greater than or equal to 20% (w/w) one or more ethylenically unsaturated monofunctional monomers, based on the total weight of the ink or coating composition. The ink and coating compositions of the present invention typically comprise from about 20% (w/w) to about 99% (w/w) monofunctional monomers, based on the total weight of the ink or coating composition. For example, monofunctional monomers may be present in an amount of about 20% to about 95%; or about 20% to about 90%; or about 20% to about 80%; or about 20% to about 70%; or about 20% to about 60%; or about 20% to about 50%; or 20% to about 45%; or about 20% to about 40%; or about 20% to about 35%; or about 20% to about 30%; or about 20% to about 25%; or about 25% to about 99%; or about 25% to about 95%; or about 25% to about 90%; or about 25% to about 80%; or about 25% to about 70%; or about 25% to about 69%; or about 25% to about 50%; or about 25% to about 45%; or about 25% to about 40%; or about 25% to about 35%; or about 25% to about 30%; or about 30% to about 99%; or about 30% to about 95%; or about 30% to about 90%; or about 30% to about 80%; or about 30% to about 70%; or about 30% to about 60%; or about 30% to about 50%.

The ink and coating compositions of the present invention preferably comprise less than about 50% (w/w) of ethylenically unsaturated multifunctional monomers. The ink and coating compositions of the present invention typically comprise from about 0% to about 50% (w/w) multifunctional monomers, based on the total weight of the ink or coating composition. For example, when present, multifunctional monomers may be present in an amount of about 0.1% to 50%; or about 0.1% to 40%; or about 0.1% to about 30%; or about 0.1% to about 20%; or about 0.1% to about 10%; or about 0.1% to about 5%; or about 0.1% to about 1%; or about 0.1% to about 0.5%; or about 0.5% to about 50%; or about 0.5% to about 40%; or about 0.5% to about 30%; or about 0.5% to about 20%; or about 0.5% to about 10%; or about 0.5% to about 5%; or about 0.5% to about 1%; or about 1% to about 50%; or about 1% to about 40%; or about 1% to about 30%; or about 1% to about 20%; or about 1% to about 10%; or about 1% to about 5%; or about 5% to about 50%; or about 5% to about 40%; or about 5% to about 30%; to about 5% to about 20%; or about 5% to about 10%; or about 10% to about 50%; or about 10% to about 40%; or about 10% to about 30%; or about 10% to about 20%.

Examples of suitable monofunctional and multifunctional ethylenically unsaturated monomers include, but are not limited to, those listed below, and combinations thereof, where the terms ethoxylated refers to chain extended compounds through the use of ethyleneoxide, propoxylated refers to chain extended compounds through the use of propylene oxide, and alkoxylated refers to chain extended compounds using either or both ethyleneoxide and propylene oxide. Preferably, the alkoxylated monomers have a degree of alkoxylation of greater than or equal to 2. Equivalent methacrylate compounds are also capable of being used, although those skilled in the art will appreciate that methacrylate compounds have lower reactivity than their equivalent acrylate counterparts.

Suitable monofunctional ethylenically unsaturated monomers include, but are not limited to: isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acrylate; stearyl acrylate; iso-stearyl acrylate; behenyl acrylate; tetrahydrofurfuryl acrylate; 4-t-butyl cyclohexyl acrylate; 3,3,5-trimethylcyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethylenglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acrylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl 1,2 (acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxy butyl acrylate; and combinations thereof.

Suitable multifunctional ethylenically unsaturated monomers include, but are not limited to: 1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3 methyl 1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10- decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis [oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-Vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxy ethyl) isocyanurate triacrylate; e-caprolactone modified tris (2-hydroxy ethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaaacrylate; dipentaerythritol hexaaacrylate; ethoxylated dipentaerythritol hexaacrylate; and combinations thereof.

Examples of monomers comprising free radically polymerizable groups other than acrylate include N-vinyl amides, vinyl ethers and vinyl esters. Examples of N-vinyl amides include, but are not limited to, N-vinylcaprolactam (NVC), N-vinyl pyrollidone (NVP), diacetone acrylamide, N-vinyl oxazolidinone or N-vinyl methoxazolidinone, N-vinyl carbazole, N-acryloxyoxyethylcyclohexanedicarboximide, N-vinyl imidazole, N-vinyl-N-methylacetamide (VIMA) or acryloyl morpholine (ACMO), and combinations thereof.

Examples of vinyl ethers and vinyl esters include, but are not limited to: 2-(2-vinyloxyethoxy)ethyl(meth)acrylate (VEEA, VEEM); diethylene glycol divinyl ether (DVE2); triethylene glycol divinyl ether (DVE3); ethyl vinyl ether; n-butyl vinyl ether; iso-butyl vinyl ether; tert-butyl vinyl ether; cyclohexyl vinyl ether (CHVE); 2-ethylhexyl vinyl ether (EHVE); dodecyl vinyl ether (DDVE); octadecyl vinyl ether (ODVE); 1-2-butanediol divinyl ether (BDDVE); 1-4, cyclohexanedimethanol divinyl ether (CHDM-di); hydroxybutyl vinylether (HBVE); 1-4-cyclohexanedimethanol monovinyl ether (CHDM-mono); 1,2,4-trivinylcyclohexane (TVCH); vinylphosphonic acid dimethylester (VPA); or vinylphosphonic acid dimethyl ester (VPADME); and combinations thereof.

The invention also includes the use of monomers and oligomers which comprise two or more different polymerisable groups as part of their chemical structure, otherwise known as hybrid monomers. Thus, the use of those monomers revealed in U.S. Pat. Nos. 6,767,980 and 6,310,115 are herein covered by the current invention. Specific examples of hybrid monomers include 2-(2-vinyloxyethoxy)ethyl acrylate ('VEEA', ex. Nippon Shokubai) and 2-(2-vinyloxyethoxy)ethyl methacrylate ('VEEM', ex. Nippon Shokubai).

Photoinitiators may optionally be included in the energy curable ink and coating compositions of the present invention, but they are not required for the EB initiation process. However, they can be included for instances where the inks, or coatings, need to be 'pinned' prior to the EB-curing stage. 'Pinning' is a recognized term in the industry and refers to any process where an inkjet print after deposition from the printhead is subjected to a process that increases the viscosity of the ink sufficiently to prevent its spreading (dot gain) and to improve the holdout of inks overprinted onto it to mitigate against ink bleed. Without pinning, a loss of print quality can ensue from the processes of excessive dot gain and ink bleed. An appropriate means of pinning an inkjet ink or coating prior to the final EB-curing stage is to partially cure the ink via a UV-pinning process. To enable this it is preferable that low concentrations of any blend of photoinitiators may be included in any composition according to the current invention. There is no limit on the concentration of the photoinitiator component of compositions of the current invention. However, as photoinitiators are known to attenuate the electron beam curing it is preferred that the total concentration of photoinitiators is below 5% (w/w) of the total composition, preferably less than 3% (w/w) and more preferably less than 1% (w/w). When ink and coating compositions of the current invention are pinned under the action of UV-light, any UV-light source producing an actinic effect can be used. A non-limiting list of potential UV light sources includes, but is not limited to, medium pressure mercury lamps, low pressure mercury lamps, UV-LED, UVC lamps, xenon lamps, and daylight. A particularly preferred photoinitiator class for the UV-pinning of inks and coatings of the current invention are the acylphosphine oxide type.

When present, photoinitiators are typically present in an amount of 0.1% to 5% (w/w), based on the total weight of the ink or coating composition. For example, the energy curable ink or coating compositions may comprise one or more photoinitiators in an amount of 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

Suitable types of photoinitiators include, but are not limited to α-hydroxyketones, acyl phosphine oxides, α-aminoketones, thioxanthones, benzophenones, phenylglyoxylates, oxime esters, and combinations thereof.

Suitable α-hydroxyketones include, but are not limited to: 1-hydroxy-cyclohexyl-phenyl-ketone; 2-hydroxy-2-methyl-1-phenyl-1-propanone; 2-hydroxy-2-methyl-4'-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis [4-(2-hydroxy-2-methylpropionyl)phenyl]methane; 2-hydroxy-1-[1-[4-(2-hydroxy-2-methylpropanoyl)phenyl]-1,3,3-trimethylindan-5-yl]-2-methylpropan-1-one; 2-hydroxy-1-[4-[4-(2-hydroxy-2-methylpropanoyl)phenoxy]phenyl]-2-methylpropan-1-one; and combinations thereof.

Suitable acylphosphine oxides include, but are not limited to: 2,4,6-trimethylbenzoyl-diphenylphosphine oxide; ethyl-(2,4,6-trimethylbenzoyl)phenyl phosphinate; bis-(2,4,6-trimethylbenzoyl)-phenylphosphine oxide; and combinations thereof.

Suitable α-aminoketones include, but are not limited to: 2-methyl-1-[4-(methylthio)phenyl]-2-morpholinopropan-1-one; 2-benzyl-2-dimethylamino-1-(4-morpholinophenyl)-butan-1-one; 2-dimethylamino-2-(4-methyl-benzyl)-1-(4-morpholin-4-yl-phenyl)-butan-1-one; and combinations thereof.

Suitable thioxanthones include, but are not limited to: 2-4-diethylthioxanthone, isopropylthioxanthone, 2-chlorothioxanthone, and 1-chloro-4-propoxythioxanthone; and combinations thereof.

Suitable benzophenones include, but are not limited to: benzophenone, 4-phenylbenzophenone, and 4-methylbenzophenone; methyl-2-benzoylbenzoate; 4-benzoyl-4-methyldiphenyl sulphide; 4-hydroxybenzophenone; 2,4,6-trimethyl benzophenone, 4,4-bis(diethylamino)benzophenone; benzophenone-2-carboxy(tetraethoxy)acrylate; 4-hydroxybenzophenone laurate; 1-[-4-[benzoylphenylsulpho]phenyl]-2-methyl-2-(4-methylphenylsulphonyl)propan-1-one; and combinations thereof.

Suitable phenylglyoxylates include, but are not limited to: phenyl glyoxylic acid methyl ester; oxy-phenyl-acetic acid 2-[hydroxyl-ethoxy]-ethyl ester; oxy-phenyl-acetic acid 2-[2-oxo-2-phenyl-acetoxy-ethoxy]-ethyl ester; and combinations thereof.

Suitable oxime esters include, but are not limited to: 1-phenyl-1,2-propanedione-2-(O-ethoxycarbonyl)oxime; [1-(4-phenylsulfanylbenzoyl)heptylideneamino]benzoate; [1-[9-ethyl-6-(2-methylbenzoyl)carbazol-3-yl]-ethylideneamino]acetate; and combinations thereof.

Examples of other suitable photoinitiators include diethoxy acetophenone; benzil; benzil dimethyl ketal; titanocen radical initiators such as titanium-bis(η 5-2,4-cyclopentadien-1-yl)-bis-[2,6-difluoro-3-(1H-pyrrol-1-yl)phenyl]; 9-fluorenone; camphorquinone; 2-ethyl anthraquinone; and the like.

An amine synergist may also be included in the formulation. Suitable examples include, but are not limited to: aromatic amines, such as 2-(dimethylamino)ethylbenzoate; N-phenyl glycine; benzoic acid, 4-(dimethylamino)-, 1,1'-[(methylimino)di-2,1-ethanediyl] ester; and simple alkyl esters of 4-(N,N-dimethylamino)benzoic acid and other positional isomers of N,N-dimethylamino)benzoic acid esters, with ethyl, amyl, 2-butoxyethyl and 2-ethylhexyl esters being particularly preferred; aliphatic amines, such as such as N-methyldiethanolamine, triethanolamine and tri-isopropanolamine; aminoacrylates and amine modified polyether acrylates, such as EBECRYL 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115 and EBECRYL P116 available from ALLNEX; CN501, CN550, CN UVA421, CN3705, CN3715, CN3755, CN381 and CN386, all available from Sartomer; GENOMER 5142, GENOMER 5161, GENOMER 5271 and GENOMER 5275 from RAHN; PHOTOMER 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9106 and LAROMER P077F, all available from BASF; AGISYN 701, AGISYN 702, AGISYN 703, NeoRad P-81 and NeoRad P-85 all available from DSM-AGI. When present, amine synergists are typically present in an amount of 0.1% to 5% (w/w), based on the total weight of the composition. For example, the energy curable ink or coating compositions may comprise one or more amine synergists in an amount of 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

Particularly preferred amine synergists are aminoacrylates formed by the Michael reaction of polymerizable acrylated monomers or oligomers, with alkanolamines, as revealed by WO 2016/186838 and included herein. The inventors have found that the EB-cure of inventive compositions is enhanced when the concentration of such aminoacrylates is greater than 2.5% and preferably 5.0% or greater. However, it should be understood that there is no restriction on the concentration of such aminoacrylates in compositions of the invention.

Polymeric photoinitiators and sensitizers are also suitable, including, for example, polymeric aminobenzoates (GENOPOL AB-1 or AB-2 from RAHN; Omnipol ASA from IGM or Speedcure 7040 from Lambson), polymeric benzophenone derivatives (GENOPOL BP-1 or BP-2 from RAHN; Omnipol BP, Omnipol BP2702 or Omnipol 682 from IGM or Speedcure 7005 from Lambson); polymeric thioxanthone derivatives (GENOPOL TX-1 or TX-2 from RAHN, Omnipol TX from IGM or Speedcure 7010 from Lambson); polymeric aminoalkylphenones such as Omnipol 910 from IGM; polymeric benzoyl formate esters such as Omnipol 2712 from IGM; and the polymeric sensitizer Omnipol SZ from IGM.

The addition of passive (inert) resins can also be advantageous as these can be used to control the porosity of the coating. Typically, acrylic based passive resins are preferred. When present, passive resins are typically present in an amount of 1% to 15% (w/w), based on the total weight of the ink or coating composition. For example, the passive resins may be present in an amount of about 1% to about 10%; or about 1% to about 5%; or about 1% to about 3%.

A stabilizer may also be used in the composition to ensure good pot life of the ink, examples of which are nitroxy based stabilizers such as OHTEMPO, TEMPO, and Irgastab UV10. Phenolic stabilizers such as hydroquinone (HQ), methyletherhydroquinone (MEHQ), butylhydroxytoluene (BHT) and 2,6-di-tert-butyl-N,N-dimethylamino-p-cresol. Nitrosophenylhydroxylamine (NPHA) base inhibitors NPHA, amine salts, and metal salts (Al salt, N-PAL) plus the aromatic amine inhibitors diphenylamine (DPA) and phenylenediamine (PPD) are also suitable. Other suitable stabilizers are florstab UV-1, UV-8, Genorad 16 and 18. When present, stabilizers are typically present in an amount of about 0.1% to 5% (w/w), based on the total weight of the ink or coating composition. For example, the energy curable ink or coating compositions may comprise one or more stabilizers in an amount of 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

Included in the ink formulation can be a suitable de-aerator, which will prevent the formation of air inclusions and pinholes in the cured coating. These also reduce rectified diffusion which can cause reliability issues in the printhead. The following products are available from EVONIK: TEGO AIREX 900, 910, 916, 920, 931, 936, 940, 944, 945, 950, 962, 980, and 986. When present, the ink and coating compositions of the present invention typically comprise about 0.1% to 5% (w/w) one or more de-aerators, based on the total weight of the composition. For example, the energy curable ink or coating compositions may comprise one or more de-aerators in an amount of 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

Defoamers can also be included in the formulation, these prevent the formation of foam during manufacture of the ink and also while jetting. These are particularly important with recirculating printheads. Suitable defoamers include TEGO FOAMEX N, FOAMEX 1488, 1495, 3062, 7447, 800, 8030, 805, 8050, 810, 815N, 822, 825, 830, 831, 835, 840, 842, 843, 845, 855, 860, 883, TEGO FOAMEX K3, TEGO FOAMEX K7/K8 and TEGO TWIN 4000 available from EVONIK. Available from BYK is BYK-066N, 088, 055, 057, 1790, 020, BYK-A 530, 067A, and BYK 354. When present, the ink and coating compositions of the present invention typically comprise about 0.1% to 5% (w/w) one or more defoamers, based on the total weight of the composition. For example, the energy curable ink or coating compositions may comprise one or more defoamers in an amount of 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

Surface control additives are often used to control the surface tension of the ink, which is required to adjust the wetting on the face plate of the printhead and also to give the desired drop spread on the substrate or, and in the case of multi pass inkjet printing, wet on dry drop spread. They can also be used to control the level of slip and scratch resistance of the coating. Suitable surface control additives include but are not limited to TEGO FLOW300, 370, 425, TEGO GLIDE 100, 110, 130, 406, 410, 411, 415, 420, 432, 435, 440, 482, A115, B1484, TEGO GLIDE ZG 400, TEGO RAD2010, 2011, 2100, 2200N, 2250, 2300, 2500, 2600, 2650, 2700, TEGO TWIN 4000, 4100, TEGO WET 240, 250, 260, 265, 270, 280, 500, 505, 510 and TEGO WET KL245 all available from EVONIK. Available from BYK are BYK 333, 337, BYK UV3500, BYK 378, 347, 361, BYK UV3530, 3570, CERAFLOUR 998, 996, NANOBYK 3601, 3610, 3650 and CERMAT 258. From CYTEC EBECRYL 350, 1360, MODAFLOW 9200, EBECRYL 341. From SARTOMER the aliphatic silicone acrylate CN9800 may be used. When present, surface control additives are typically present in an amount of about 0.1% to about 5% (w/w), based on the total weight of the ink or coating composition. For example, the energy curable ink or coating compositions may comprise one or more surface control additives in an amount of 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

The inks and coatings of the present invention may also contain one or more aliphatic silicone acrylates, such as silicone polyether acrylates. When present, the aliphatic silicone acrylates are typically present in an amount of 0% to 5% (w/w), based on the total weight of the composition. For example, the aliphatic silicone acrylates may be present in an amount of about 0.1% to about 5%; or about 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

The ink and coating compositions of the present invention may optionally contain one or more solvents. Solvents include, but are not limited to, water, hydrocarbons, ethers, esters, and ketones. When present, the solvents are included in an amount of less than 5% (w/w), based on the total weight of the ink or coating composition. For example, the solvents may be present in an amount of about 0.1% to 5% (w/w); or 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

The ink compositions of the present invention may optionally contain one or more colorants, including pigments and/or dyes. Examples of suitable organic or inorganic pigments include carbon black, zinc oxide, titanium dioxide, phthalocyanine, anthraquinones, perylenes, carbazoles, monoazo and disazobenzimidazoles, rhodamines, indigoids, quinacridones, diazopyranthrones, dinitranilines, pyrazoles, diazopyranthrones, dinityanilines, pyrazoles, dianisidines, pyranthrones, tetracholoroisoindolines, dioxazines, monoazoacrylides and anthrapyrimidines. The dyes include but are not limited to azo dyes, anthraquinone dyes, xanthene dyes, azine dyes, combinations thereof and the like.

Commercial organic pigments classified according to Color Index International according to the following trade designations, blue pigments PB1, PB15, PB15:1, PB15:2, PB15:3, PB15:4, PB15:6, PB16, PB60; brown pigments PBS, PB23, and PB265; green pigments PG1, PG7, PG10 and PG36; yellow pigments PY3, PY14, PY16, PY17, PY24, PY65, PY73, PY74 PY83, PY95, PY97, PY108, PY109, PY110, PY113, PY128, PY129, PY138, PY139, PY150, PY151, PY154, PY156, PY175, PY180 and PY213; orange pigments P05, P015, P016, P031, P034, P036, P043, P048, P051, P060, P061 and P071; red pigments PR4, PR5, PR7, PR9, PR22, PR23, PR48, PR48:2, PR49, PR112, PR122, PR123, PR149, PR166, PR168, PR170, PR177, PR179, PR190, PR202, PR206, PR207, PR224 and PR254: violet pigments PV19, PV23, PV32, PV37 and PV42; black pigments.

The pigments are milled to typically less than 1 micrometer after milling with a preferred particle size distribution of 10-500 nm, more preferably 10-350 nm to have better transparency and a wide color gamut. The pigment dispersion will typically contain 60-90% monomer which can be a mono or multifunctional (meth)acrylate monomer, with added stabilizer, inhibitor, dispersant and optionally a pigment additive/synergist and/or a wetting additive/oligomer/resin. The ratio of pigment to dispersant would usually be between 1:2 to 9:1 depending on the chemistry of the pigment and dispersant. Examples of typical dispersants would include EFKA 7414, 7476, 7477, 7700, 7701, 7702, 7710, 7731 and 7732 available from BASF and SOLSPERSE 1700, 1900, 24000SC/GR, 26000, 32000, 33000, 35000, 36000, 39000, 41000 and 71000 available from LUBRIZOL. Examples of additive/synergists to aid dispersion stability include SOLSPERSE 5000, 12000 and 22000 from LUBRIZOL.

When present, organic pigments and dyes are typically present in an amount of about 0.1% to about 7% (w/w), based on the total weight of the composition. For example, the organic pigments and dyes may be present in an amount of 0.1% to 6.5%; or 0.1% to 6%; or 0.1% to 5.5%; or 0.1% to 5%; or 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 7%; or 0.5% to 6.5%; or 0.5% to 6%; or 0.5% to 5.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%; or 1% to 7%; or 1% to 6.5%; or 1% to 6%; or 1% to 5.5%; or 1% to 5%; or 1% to 4.5%; or 1% to 4%; or 1% to 3.5%; or 1% to 3%; or 1% to 2.5%; or 1% to 2%; or 1% to 1.5%.

When present, inorganic pigments are typically present in an amount of 1% to 40% (w/w), based on the total weight of the composition. For example, the inorganic pigments may be present in an amount of 1% to 35%; or 1% to 30%; or 1% to 25%; or 1% to 20%; or 1% to 15%; or 5% to 40%; or 5% to 35%; or 5% to 30%; or 5% to 25%; or 5% to 20%; or 5% to 15%; or 10% to 35%; or 10% to 30%; or 10% to 25%; or 10% to 20%; or 10% to 15%; or 15% to 40%; or 15% to 35%; or 15% to 30%; or 15% to 25%; or 15% to 20%; or 20% to 40%; or 20% to 35%; or 20% to 30%; or 20% to 25%.

The EB dose typically used in the method of the present invention is between 30 kGy and 200 kGy. For example, the EB dose may be greater than or equal to 30 kGy; or greater than or equal to 40 kGy; or greater than or equal to 50 kGy; or greater than or equal to 60 kGy; or greater than or equal to 70 kGy; or greater than or equal to 80 kGy; or greater than or equal to 90 kGy; or greater than or equal to 100 kGy; or greater than or equal to 110 kGy; or greater than or equal to 120 kGy; or greater than or equal to 130 kGy; or greater than or equal to 140 kGy; or greater than or equal to 150 kGy. For example, the EB dose may be between 30 to 200 kGy; or between 40 to 200 kGy; or between 50 to 200 kGy; or between 60 to 200 kGy; or between 70 to 200 kGy; or between 80 to 200 kGy; or between 90 to 200 kGy; or between 100 to 200 kGy; or between 110 to 200 kGy; or between 120 to 200 kGy; or between 130 to 200 kGy; or between 140 to 200 kGy; or between 150 to 200 kGy; or between 160 to 200 kGy; or between 170 to 200 kGy; or between 180 to 200 kGy; or between 190 to 200 kGy; or between 30 to 190 kGy; or between 30 to 180 kGy; or between 30 to 170 kGy; or between 30 to 180 kGy; or between 30 to 170 kGy; or between 30 to 160 kGy; or between 30 to 150 kGy; or between 30 to 140 kGy; or between 30 to 130 kGy; or between 30 to 120 kGy; or between 30 to 110 kGy; or between 30 to 100 kGy; or between 30 to 90 kGy; or between 30 to 80 kGy; or between 30 to 70 kGy; or between 30 to 60 kGy; or between 30 to 50 kGy; or between 30 to 40 kGy; or between 40 to 190 kGy; or between 40 to 180 kGy; or between 40 to 170 kGy; or between 40 to 160 kGy; or between 40 to 150 kGy; or between 40 to 140 kGy; or between 40 to 130 kGy; or between 40 to 120 kGy; or between 40 to 110 kGy; or between 40 to 100 kGy; or between 40 to 90 kGy; or between 40 to 80 kGy; or between 40 to 70 kGy; or between 40 to 60 kGy; or between 40 to 50 kGy; or between 50 to 190 kGy; or between 50 to 180 kGy; or between 50 to 170 kGy; or between 50 to 160 kGy; or between 50 to 150 kGy; or between 50 to 140 kGy; or between 50 to 130 kGy; or between 50 to 120 kGy; or between 50 to 110 kGy; or between 50 to 100 kGy; or between 50 to 90 kGy; or between 50 to 80 kGy; or between 50 to 70 kGy; or between 50 to 60 kGy; or between 60 to 190 kGy; or between 60 to 180 kGy; or between 60 to 170 kGy; or between 60 to 160 kGy; or between 60 to 150 kGy; or between 60 to 140 kGy; or between 60 to 130 kGy; or between 60 to 120 kGy; or between 60 to 110 kGy; or between 60 to 110 kGy; or between 60 to 100 kGy; or between 60 to 90 kGy; or between 60 to 80 kGy; or between 60 to 70 kGy; or between 70 to 190 kGy; or between 70 to 180 kGy; or between 70 to 170 kGy; or between 70 to 160 kGy; or between 70 to 150 kGy; or between 70 to 140 kGy; or between 70 to 130 kGy; or between 70 to 120 kGy; or between 70 to 110 kGy; or between 70 to 100 kGy; or between 70 to 90 kGy; or between 70 to 80 kGy; or between 80 to 190 kGy; or between 80 to 180 kGy; or between 80 to 170 kGy; or between 80 to 160 kGy; or between 80 to 150 kGy; or between 80 to 140 kGy; or between 80 to 130 kGy; or between 80 to 120 kGy; or between 80 to 110 kGy; or between 80 to 100 kGy; or between 80 to 90 kGy.

The accelerating voltage of the EB radiation used in the method of the present invention is typically between 70 keV and 200 keV. For example, the accelerating voltage may be between 80 and 200 keV; or between 90 and 200 keV; or between 100 and 200 keV; or between 110 and 200 keV; or between 120 and 200 keV; or between 130 and 200 keV; or between 140 and 200 keV; or between 150 and 200 keV; or between 160 and 200 keV; or between 170 and 200 keV; or between 180 and 200 keV; or between 190 and 200 keV. For example, the accelerating may be between 70 and 150 keV; or between 70 and 140 keV; or between 70 and 130 keV; or between 70 and 120 keV; or between 70 and 110 keV; or between 70 and 100 keV; or between 70 and 90 keV; or between 70 and 80 keV; or between 80 and 190 keV; or between 80 and 180 keV; or between 80 and 170 keV; or between 80 and 160 keV; or between 80 and 150 keV; or between 80 and 140 keV; or between 80 and 130 keV; or between 80 and 120 keV; or between 80 and 110 keV; or between 80 and 100 keV; or between 80 and 90 keV; or between 90 and 190 keV; or between 90 and 180 keV; or between 90 and 170 keV; or between 90 and 160 keV; or between 90 and 150 keV; or between 90 and 140 keV; or between 90 and 130 keV; or between 90 and 120 keV; or between 90 and 110 keV; or between 90 and 100 keV.

In an energy curable inkjet formulation the solvent resistance will be directly proportional to the crosslink density of the cured coating which will in turn be determined by the functionality of the polymerizable monomers, although this will be reduced if the degree of conversion of the monomers is reduced. The degree of conversion could be reduced if the photoinitiator package is not optimized to the spectral output of the lamps or if a passive resin is used in the formulation. The principle will follow that the higher the reactive functionality the more rapidly crosslink density increases during polymerization. Degree of conversion can also be increased by either elevating the ink temperature during cure, increasing the substrate temperature, or curing under nitrogen to prevent oxygen inhibition. Steric factors such as the location of the polymerizable groups can also affect degree of conversion. As crosslinking proceeds, then the glass transition temperature of the cured film will increase with double bond conversion. If the glass transition point is lower than the curing temperature, double bond consumption can continue until close to 100% conversion is achieved. The vitrification point, and hence the properties of the cured ink, can be altered by careful selection of monomers, photoinitiators and stabilizers, plus control of external factors such as lamp spectra output, temperature of cure and the presence of nitrogen inerting.

Polar groups such as hydroxy or carboxy groups will increase the surface tension, while nonpolar groups, such as long alkyl chains, siloxanes, or (fluoro)alkyl groups, reduce it.

Good adsorption between the film and the substrate will improve the adhesion so the number and strength of the contact with the substrate needs to be maximized. Typically inclusion of materials with hydroxyl or carboxyl functionality can be beneficial. Selection of monomers that can swell the substrate and increase penetration of the ink into the substrate will help adhesion. Examples of these can include N-vinylcaprolactam (NVC) and acryloyl morpholine (ACMO) for energy curable inkjet formulations. Another area that causes problems is shrinkage during cure. This will reduce the contact of the cured ink with the substrate, which will reduce adhesion. Higher crosslink density will result in greater shrinkage, and hence reduced adhesion, which can be overcome by curing by electron beam bombardment.

The formulated composition can be cured by electron beam cure using an acceleration voltage of 100 to 200 keV, a dose of 40 to 200 kGy, and nitrogen inertion giving an oxygen level of less than or equal to 200 parts per million (ppm). The resultant cured coating will preferably have good solvent resistance on plastic substrates such as polycarbonate, PVC, acrylic, polypropylene, polystyrene, HDPE, LDPE and aluminium composite materials.

EXAMPLES

The following examples illustrate specific aspects of the present invention and are not intended to limit the scope thereof in any respect and should not be so construed.

Preparation of Ink and Coating Compositions

Inks were prepared according to the compositions below and stirred until homogeneous using a Silverson mixer. The ink formulations are shown in Table 1, and the cyan dispersion formulations used in the ink formulations are shown in Table 2.

Solvent Resistance

Each ink was printed on a substrate, as shown below in Tables 3 to 9, and cured to produce a test specimen. The test specimen was placed on a flat surface, and the ink tested for solvent resistance. A cotton-tipped stick (cotton bud) was soaked in solvent (ethanol or methyl ethyl ketone (MEK)). The soaked cotton bud was wiped backwards and forwards across the test specimen. The number of times the cotton bud was returned to the starting position (i.e. "double wipes") before the laminate surface was affected was counted. The number of double wipes, up to a maximum of 100, achieved before the ink layer started to break was recorded.

Example 1. Formulations of EB Curable and UV Curable Inks

Inventive Inks 1, 2, and 5, and comparative Inks 3, 4, and 6, were prepared according to the formulations shown in Table 1. Inks 1, 2 and 5 contain greater than 20% (w/w) monofunctional monomers, and no photoinitiator. Inks 3 and 4 contain only multifunctional monomers. Ink 6 is a UV curable ink. The formulations of Cyan dispersion 1 and Cyan dispersion 2 are shown in Table 2.

TABLE 1

EB curable and UV curable inks

| Material | Ink 1 | Ink 2 | Ink 3 | Ink 4 | Ink 5 | Ink 6 |
| --- | --- | --- | --- | --- | --- | --- |
| DPGDA[1] | 30.42 | | 32.80 | 34.00 | | |
| MIRAMER M-140[2] | 20.20 | | | | | |
| SR238 (EU)[3] | 30.86 | | | | | |
| SR531 (EU)[4] | | 21.63 | | | 25.25 | 18.00 |
| N VINYL CAPROLACTAM[5] | | 28.60 | | | 28.60 | 25.49 |
| SR506D[6] | | 14.59 | | | 14.59 | 13.00 |
| MIRAMER M1142[7] | | 22.45 | | | 22.45 | 20.00 |
| SR399[8] | | 1.12 | | | | 1.00 |
| SR341[9] | | | 30.00 | 30.00 | | |
| VEEA-AI[10] | | | 25.00 | 25.00 | | |
| IRGASTAB UV 25[11] | 1.00 | | | | | |
| Elvacite 2013[12] | 1.22 | | | | | |
| STABILISER 11-873[13] | | 2.50 | | | | 2.50 |
| STABILIZER 12-191[14] | 1.00 | | 1.00 | | | |
| IONOL 103[15] | | | | 0.20 | | |
| CN9800[16] | | 1.00 | | | 1.00 | 1.00 |
| TEGO GLIDE 410[17] | 0.50 | | 2.00 | 2.00 | | |
| Omnirad TPO[18] | | | | | | 4.90 |
| Irgacure 819[19] | | | | | | 4.00 |
| Speedcure DETX[20] | | | | | | 2.00 |
| Cyan Dispersion 1 | 14.80 | 8.11 | | | 8.11 | 8.11 |
| Cyan Dispersion 2 | | | 9.00 | 9.00 | | |
| TOTAL | 100.0 | 100.0 | 100.0 | 100.0 | 100.0 | 100.0 |

Inks 1 to 6 have viscosities of between 3-14 cps at 40° C., which is typical of the range preferred for inkjet printing.

TABLE 2

Cyan dispersions

| Material | Cyan Dispersion 1 | Cyan Dispersion 2 |
| --- | --- | --- |
| PONPGDA[21] | | 62.34 |
| MIRAMER M-140[2] | 55.0 | |
| EFKA PX4701[22] | 14.0 | 11.66 |
| STABILIZER 12-191[14] | 1.0 | 1.0 |
| Heliogen Blue D7110[23] | 30.0 | 25.0 |

[1]Dipropyleneglycol Diacrylate ex Allnex
[2]2-Phenoxyethylacrylate ex Miwon
[3]Hexanediol Diacrylate ex Arkema
[4]Cyclic Trimethylolpropane Formal Acrylate ex Arkema
[5]N-Vinyl Caprolactam ex BASF
[6]Isobornyl Acrylate ex Arkema
[7]M1142 ex Miwon
[8]Di-Pentaerythritol Pentaacrylate ex Allnex
[9]3-Methyl 1,5-Pentanediol Diacrylate ex Arkema
10 2-(2-vinyloxyethoxy)ethylacrylate ex Nippon Shokubia
[11]Irgastab UV 25 ex BASF
[12]Elvacite 2013 ex Lucite
[13]Stabilizer 11-873 ex Rahn
[14]Stabilizer 12-191 ex Rahn
[15]Ionol 103 ex Oxiris
[16]CN9800 ex Arkema

[17] Tego Glide 410 ex Evonik
[18] Omnirad TPO ex IGM
[19] Irgacure 819 ex BASF
[20] Speedcure DETX ex Lambson
[21] PONPGDA ex Arkema
[22] EFKA PX4701 ex BASF
[23] Heliogen Blue D7110 ex BASF Example 2. Solvent Resistance of EB Curable Inks Inks 1 to 5 were applied using 12 μm drawdowns, followed by cure using a Comet EB unit. The EB unit has a maximum beam energy of 200 keV, with doses up to 450 kGy in a single pass possible. Nitrogen inertion was applied until the oxygen level was less than 200 ppm. The electron voltage was recorded in keV, and the dose of electrons in kGy. Solvent resistance was measured on each sample.

Table 3 shows the solvent resistance of Inks 1 to 3 on different substrates, when cured at an accelerating voltage of 100 keV, and a dose of 70 kGy.

TABLE 3

Solvent resistance of Inks 1 to 3 cured at 100 keV and 70 kGy

| | Acrylic[24] | | Poly-carbonate[25] | | Rigid PVC[26] | | PET[27] | |
|---|---|---|---|---|---|---|---|---|
| | Ethanol rubs | MEK rubs | Ethanol rubs | MEK rubs | Ethanol rubs | MEK rubs | Ethanol rubs | MEK rubs |
| Ink 1 | >100 | >100 | >100 | >100 | >100 | >100 | >100 | >100 |
| Ink 2 | >100 | 17 | 89 | 17 | >100 | 50 | 83 | 25 |
| Ink 3 | >100 | >100 | >100 | >100 | >100 | >100 | >100 | >100 |

[24] 3 mm rigid acrylic ex Amari Plastics
[25] 3 mm rigid polycarbonate ex Amari Plastics
[26] 0.5 mm rigid PVC ex Alibaba
[27] Melinex 752 ex Hififilm The data in Table 3 shows that good solvent resistance can be obtained on acrylic, polycarbonate, PVC and PET with Inks 1 to 3 when the inks are cured with an accelerating voltage of 100 keV, and an EB dose of 70 kGy. This is a surprising finding given the high monofunctional monomer content of Ink 1. Ink 2, which comprises less than 2% of a multifunctional monomer, also produces surprising high solvent resistance.

Table 4 shows the solvent resistance of Inks 1 to 3 on different substrates, when cured at an accelerating voltage of 150 keV and an EB dose of 100 kGy.

TABLE 4

Solvent resistance of Inks 1 to 3 cured at 150 keV and 100 kGy

| | Acrylic[24] | | Poly-carbonate[25] | | Rigid PVC[26] | | PET[27] | |
|---|---|---|---|---|---|---|---|---|
| | Ethanol rubs | MEK rubs | Ethanol rubs | MEK rubs | Ethanol rubs | MEK rubs | Ethanol rubs | MEK rubs |
| Ink 1 | >100 | >100 | >100 | >100 | >100 | >100 | >100 | >100 |
| Ink 2 | >100 | 16 | >100 | 18 | >100 | 35 | >100 | 17 |
| Ink 3 | >100 | >100 | >100 | >100 | >100 | >100 | >100 | >100 |

The data in Table 4 show that good solvent resistance can be obtained on acrylic, polycarbonate, PVC, and PET with Inks 1 to 3 when they are cured at an accelerating voltage of 150 keV, and an EB dose of 100 kGy.

Table 5 shows the solvent resistance of Inks 1 to 3 when cured at an accelerating voltage of 200 keV, and EB dose of 200 kGy.

TABLE 5

Solvent resistance of Inks 1 to 3 at 200 keV and 200 kGy

| | Acrylic[24] | | Polycarbonate[25] | |
|---|---|---|---|---|
| | Ethanol Rubs | MEK Rubs | Ethanol Rubs | MEK Rubs |
| Ink 1 | >100 | >100 | >100 | >100 |
| Ink 2 | >100 | 17 | 80 | 18 |
| Ink 3 | >100 | >100 | >100 | >100 |

The data in Table 5 show that good solvent resistance can be obtained on acrylic and polycarbonate with Inks 1 to 3 using 200 keV accelerating voltage, and an EB dose of 200 kGy.

Inks 4 and 5 were applied to flame treated HDPE. The adhesion of Inks 4 and 5 was tested after curing at an accelerating voltage of 100 keV, and an EB dose of either 50 kGy or 80 kGy. The results are shown in Table 6.

TABLE 6

Solvent resistance of Inks 4 and 5 at 100 keV and either 50 or 80 kGy

| | HDPE | |
|---|---|---|
| | Ethanol Rubs | MEK Rubs |
| Ink 4, 100 kev/50 kGy | >100 | >100 |
| Ink 5, 100 kev/50 kGy | >100 | 18 |
| Ink 4, 100 kev/80 kGy | >100 | >100 |
| Ink 5, 100 kev/80 kGy | >100 | 21 |

The data in Table 6 shows that good solvent resistance can be obtained on HDPE with Inks 4 and 5 with an accelerating voltage of 100 keV, and an EB dose of either 50 kGy or 80 kGy.

Example 3. Comparative Results for EB Curable Inks Cured at Low EB Doses

Table 7 shows the solvent resistance of Inks 1 to 3 on different substrates, when cured at an accelerating voltage of 100 keV and an EB dose of 30 kGy.

TABLE 7

Solvent resistance of Inks 1 to 3 at 100 keV and 30 kGy

| | Acrylic[24] | | Poly-carbonate[25] | | Rigid PVC[26] | | PET[27] | |
|---|---|---|---|---|---|---|---|---|
| | Ethanol rubs | MEK rubs | Ethanol rubs | MEK rubs | Ethanol rubs | MEK rubs | Ethanol rubs | MEK rubs |
| Ink 1 | 7 | 3 | 9 | 3 | 8 | 3 | 9 | 3 |
| Ink 2 | 6 | 2 | 11 | 2 | 7 | 2 | 10 | 2 |
| Ink 3 | 9 | 4 | 9 | 3 | 9 | 3 | 8 | 3 |

The data in Table 7 show that, for Inks 1 to 3, poor solvent resistance is obtained on acrylic, polycarbonate, PVC and PET when the EB cure dose is reduced to 30 kGy.

Table 8 shows the solvent resistance of Inks 4 and 5 on flame treated HDPE, when cured at an accelerating voltage of 100 keV and an EB dose of 30 kGy.

TABLE 8

Solvent resistance of Inks 4 and 5 at 100 keV and 30 kGy

| | HDPE | |
|---|---|---|
| | Ethanol Rubs | MEK Rubs |
| Ink 4 | 11 | 3 |
| Ink 5 | 9 | 2 |

The data in Table 8 show that, for Inks 4 and 5, poor solvent resistance is obtained on HDPE when the EB cure dose is reduced to 30 kGy.

Example 4. Solvent Resistance of a UV Curable Ink

Comparative Ink 6 was applied to different substrates at a thickness of 12 μm, and cured using a medium pressure Hg lamp, at UV doses from 50 mJ/cm$^2$ to 1000 mJ/cm$^2$. Solvent resistance was tested as described above, and the results are shown in Table 9.

TABLE 9

Solvent resistance of UV curable Ink 6

| | 50 mJ/cm$^2$ | | 150 mJ/cm$^2$ | | 300 mJ/cm$^2$ | | 1000 mJ/cm$^2$ | |
|---|---|---|---|---|---|---|---|---|
| | Ethanol rubs | MEK rubs | Ethanol rubs | MEK rubs | Ethanol rubs | MEK rubs | Ethanol rubs | MEK rubs |
| Acrylic | 8 | 2 | 26 | 5 | 19 | 6 | 39 | 8 |
| Polycarbonate | 10 | 3 | 26 | 7 | 25 | 6 | 38 | 8 |
| Rigid PVC | 8 | 3 | 50 | 9 | 42 | 9 | 43 | 9 |
| PET | 10 | 3 | 22 | 5 | 37 | 6 | 32 | 6 |

The data in Table 9 show that Ink 6, which is formulated using predominantly monofunctional monomers and cured using a conventional medium pressure lamp, has significantly worse ethanol and MEK resistance than the equivalent Ink 2 cured by an EB dose greater than 30 kGy.

The results generally show that the use of EB doses of greater than 30 kGy results in superior solvent resistance for all inks, including inks essentially based on multifunctional monomers and those based largely on monofunctional monomers. This is apparent by comparing the results in Tables 3 to 5 (70 kGy, 150 kGy, and 200 kGy), with the results in Table 7 (30 kGy). This is a surprising finding given the high monofunctional monomer content of Ink 1. Inventive Ink 2, which comprises less than 2% of a multifunctional monomer, also produces surprising high solvent resistance, notably higher than a comparable composition containing photoinitiators and cured under the action of UV light (see Ink 6, Table 9).

Thus, the examples described above demonstrate the efficacious use of electron beam doses of greater than 30 kGy in delivering cured inkjet prints having significantly improved solvent resistance than is achievable with EB doses typical of those used commercially and in the prior art of 30 kGy or less. Furthermore, the use of such elevated EB doses in producing this effect is demonstrably greater than is achievable with compositions comprising photoinitiators cured under the action of UV light.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. A method for printing an energy curable ink or coating composition comprising:
   a) providing an energy curable ink or coating composition, wherein the ink or coating composition comprises:
      i) greater than or equal to 20% (w/w) one or more monofunctional ethylenically unsaturated monomers or oligomers, based on the total weight of the ink or coating composition;
      ii) less than or equal to 50% (w/w) one or more multifunctional ethylenically unsaturated monomers or oligomers, based on the total weight of the ink or coating composition;
      iii) 0% to 5% (w/w) one or more solvents, based on the total weight of the ink or coating composition;
      iv) 0% to 5% (w/w) one or more photoinitiators, based on the total weight of the ink or coating composition;
      v) 0% to 7% (w/w) one or more organic pigments or dyes, based on the total weight of the ink or coating composition; and
      vi) 0% to 40% (w/w), one or more inorganic pigments, based on the total weight of the ink or coating composition;
   b) applying the ink or coating composition of step a) to a substrate; and
   c) curing the applied ink or coating composition by exposure to electron beam radiation with an electron beam emitter, wherein:
      i) the accelerating voltage of the electron beam emitter is equal to or greater than 70 keV;
      ii) cure dose is equal to or greater than 50 kGy.

2. The method of claim 1, wherein the one or more monofunctional ethylenically unsaturated monomers or oligomers are present in an amount of greater than or equal to 30% (w/w).

3. The method of claim 1, wherein the one or more multifunctional ethylenically unsaturated monomers or oligomers are present in amount of less than or equal to 40% (w/w).

4. The method of claim 1, wherein the one or more solvents are present in an amount of less than or equal to 3% (w/w).

5. The method of claim 1, wherein the one or more colorants comprise 0.1% to 7% (w/w) one or more organic pigments or dyes.

6. The method of claim 1, wherein the one or more colorants comprise 1% to 40% (w/w) one or more inorganic pigments.

7. The method of claim 1, wherein the energy curable ink or coating composition further comprises 0.1% to 5% (w/w) one or more photoinitiators.

8. The method of claim 7, wherein the one or more photoinitiators are each independently selected from the group consisting of thioxanthone, acylphosphine oxide, aminoketone, oxime, and ketocoumarin.

9. The method of claim 7, wherein the energy curable ink or coating composition comprises less than 1% (w/w) of an acylphosphine oxide photoinitiator, based on the total weight of the ink or coating composition.

10. The method of claim 7, wherein the energy curable ink or coating composition comprises the photoinitiator bis(2,4,6-trimethylbenzoyl)-phenylphosphineoxide.

11. The method of claim 1, wherein the energy curable ink or coating composition further comprises 1% to 15% (w/w) one or more passive/inert resins.

12. The method of claim 1, wherein the energy curable ink or coating composition further comprises 0.1% to 5% (w/w) one or more additives selected from the group consisting of de-aerators, defoamers, surface control additives, rheology modifiers, dispersants, stabilizers, inhibitors, wetting agents.

13. The method of claim 1, wherein the accelerating voltage is greater than or equal to 80 keV.

14. The method of claim 1, wherein the accelerating voltage of the electron beam emitter is between 70 keV and 200 keV.

15. The method of claim 1, wherein the cure dose is between 70 kGy and 200 kGy.

16. The method of claim 1, wherein the substrate is a plastic substrate.

17. The method of claim 1, wherein the energy curable ink or coating composition is an inkjet ink or coating composition.

18. A printed substrate prepared by the method of claim 1.

19. The printed substrate of claim 18, wherein the substrate is selected from a plastic film, a plastic laminate, and a plastic-paperboard laminate.

* * * * *